(12) United States Patent
Islam et al.

(10) Patent No.: US 10,869,258 B2
(45) Date of Patent: Dec. 15, 2020

(54) BEAM SPECIFIC BACKOFF INDICATOR

(71) Applicant: QUALCOMM Incorporated, San Diego, CA (US)

(72) Inventors: Muhammad Nazmul Islam, Edison, NJ (US); Chetan Chakravarthy, San Diego, CA (US); Junsheng Han, Sunnyvale, CA (US); Chun-Hao Hsu, San Jose, CA (US); Navid Abedini, Somerset, NJ (US); Bilal Sadiq, Basking Ridge, NJ (US); Junyi Li, Chester, NJ (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 78 days.

(21) Appl. No.: 16/155,426

(22) Filed: Oct. 9, 2018

(65) Prior Publication Data

US 2019/0110242 A1 Apr. 11, 2019

Related U.S. Application Data

(60) Provisional application No. 62/588,196, filed on Nov. 17, 2017, provisional application No. 62/570,412, filed on Oct. 10, 2017.

(51) Int. Cl.
*H04W 48/06* (2009.01)
*H04J 11/00* (2006.01)
(Continued)

(52) U.S. Cl.
CPC ......... *H04W 48/06* (2013.01); *H04J 11/0069* (2013.01); *H04B 7/0413* (2013.01); *H04B 7/0617* (2013.01); *H04W 74/0833* (2013.01)

(58) Field of Classification Search
CPC ............... H04W 48/06; H04W 74/0833; H04J 11/0069; H04B 7/0617; H04B 7/0413
See application file for complete search history.

(56) References Cited

U.S. PATENT DOCUMENTS

| | | | |
|---|---|---|---|
| 2012/0051297 A1 | 3/2012 | Lee et al. | |
| 2013/0242730 A1* | 9/2013 | Pelletier | H04W 28/0284 370/230 |
| 2018/0279380 A1* | 9/2018 | Jung | H04W 56/0005 |

OTHER PUBLICATIONS

Asustek et al., "Discussion on RA Backoff in NR", 3GPP Draft, R2-1707010 Discussion on RA Backoff in NR, 3rd Generation Partnership Project (3GPP), Mobile Competence Centre, 650, Route Des Lucioles, F-06921 Sophia-Antipolis Cedex, France, vol. RAN WG2, No. Qingdao, China, Jun. 27, 2017-Jun. 29, 2017, Jun. 16, 2017 (Jun. 16, 2017), XP051306695, 4 Pages, Retrieved from the Internet: URL:http://www.3gpp.org/ftp/tsg_ran/WG2_RL_2/TSGR2_AHs/2017_06_NR/Docs/ [retrieved on Jun. 16, 2017].

(Continued)

*Primary Examiner* — Afshawn M Towfighi
(74) *Attorney, Agent, or Firm* — Patterson & Sheridan, L.L.P.

(57) ABSTRACT

Certain aspects of the present disclosure provide techniques for selecting a base station for a user equipment to communicate with on an uplink. Certain aspects provide a method for wireless communication. The method generally includes transmitting, from a first node, one or more indicators of a plurality of different backoff indicators associated with a plurality of different synchronization signal blocks (SSBs) to a second node. The method further includes transmitting, from the first node, each of one or more of the plurality of different SSBs in a different spatial direction.

25 Claims, 11 Drawing Sheets

(51) Int. Cl.
*H04W 74/08* (2009.01)
*H04B 7/0413* (2017.01)
*H04B 7/06* (2006.01)

(56) References Cited

OTHER PUBLICATIONS

Catt: "Consideration on BI", 3GPP Draft; R2-1706365, 3rd Generation Partnership Project (3GPP), Mobile Competence Centre, 650, Route Des Lucioles, F-06921 Sophia-Antipolis Cedex , France vol. RAN WG2, No. Qingdao, China, Jun. 27, 2017-Jun. 29, 2017, Jun. 17, 2017 (Jun. 17, 2017), 2 Pages, XP051306969, Retrieved from the Internet: URL:http://www.3gpp.org/ftp/tsg_ran/WG2_RL2/TSGR2_AHs/2017 06_NR/Docs/ [retrieved on Jun. 17, 2017].
Ericsson: "Differentiation on RACH Parameters", 3GPP Draft; R2-1708191-Differentiation on RACH Parameters, 3rd Generation Partnership Project (3GPP), Mobile Competence Centre, 650, Route Des Lucioles, F-06921 Sophia-Antipolis Cedex , France, vol. RAN WG2, No. Berlin, Germany, Aug. 21, 2017-Aug. 25, 2017, Aug. 20, 2017 (Aug. 20, 2017), XP051318094, 4 Pages, Retrieved from the Internet: URL:http://www.3gpp.org/ftp/Meetings_3GPP_SYNC/RAN2/Docs/ [retrieved on Aug. 20, 2017].
Ericsson: "MAC RAR PDU Design", 3GPP Draft; R2-1708193-MAC RAR PDU Design, 3rd Generation Partnershis Project (3GPP), Mobile Competence Centre, 650, Route Des Lucioles, F-06921 Sophia-Antipolis Cedex, France, vol. RAN WG2, No. Berlin, Germany; Aug. 21, 2017-Aug. 25, 2017, Aug. 20, 2017 (Aug. 20, 2017), XP051318096, 4 Pages, Retrieved from the Internet: URL:http://www.3gpp.org/ftp/Meetings_3GPP SYNC/RAN2/Docs/ [retrieved on Aug. 20, 2017].
Ericsson: "RAR Design and Contents", 3GPP Draft; R2-1711174-RAR Design and Contents, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Oct. 8, 2017 (Oct. 8, 2017), XP051343182, 6 Pages, Retrieved from the Internet: URL:http://www.3gpp.org/ftp/Meetings_3GPP SYNC/RAN2/Docs/ [retrieved on Oct. 8, 2017].
Ericsson: "Remaining Details on RACH Procedure", 3GPP Draft; R1-1716155_Remaining Details on Rach Procedure, 3rd Generation Partnership Project (3GPP), Mobile Competence Centre, 650, Route Des Lucioles, F-06921 Sophia-Antipolis Cedex, France vol. RAN WG1, No. Nagoya, Japan, Sep. 18, 2017-Sep. 21, 2017, Sep. 17, 2017 (Sep. 17, 2017), XP051339613, 19 Pages, Retrieved from the Internet: URL:http://www.3gpp.org/ftp/Meetings_3GPP SYNC/RAN1/ Docs/ retrieved on Sep. 17, 2017].
International Search Report and Written Opinion—PCT/US2018/055187—ISA/EPO—Dec. 11, 2018.

* cited by examiner

BEAM SPECIFIC BACKOFF INDICATOR

CROSS-REFERENCE TO RELATED APPLICATIONS

This application claims the benefit of U.S. Provisional Patent No. 62/588,196, filed Nov. 17, 2017 and U.S. Provisional Patent No. 62/570,412, filed Oct. 10, 2017. The content of each of the provisional applications is hereby incorporated by reference in its entirety.

INTRODUCTION

Aspects of the present disclosure relate to wireless communications and techniques for determining and utilizing a beam specific backoff indicator for random access in a wireless communication network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes transmitting, from a first node, one or more indicators of a plurality of different backoff indicators associated with a plurality of different synchronization signal blocks (SSBs) to a second node. The method further includes transmitting, from the first node, each of one or more of the plurality of different SSBs in a different spatial direction.

Certain aspects provide a method for wireless communication. The method generally includes receiving, from a first node, by a second node, one or more indicators of a plurality of different backoff indicators associated with a plurality of different synchronization signal blocks (SSBs). The method further includes selecting a transmission time of a random access retransmission, by the second node, using a preamble associated with one of the plurality of different SSBs based on a backoff indicator of the plurality of different backoff indicators that is associated with the one of the plurality of different SSBs.

Certain aspects provide a first node including a memory and a processor coupled to the memory. The processor is configured to transmit one or more indicators of a plurality of different backoff indicators associated with a plurality of different synchronization signal blocks (SSBs) to a second node. The processor is further configured to transmit one or more of the plurality of different SSBs.

Certain aspects provide a first node including a memory and a processor coupled to the memory. The processor is configured to receive, from a second node, one or more indicators of a plurality of different backoff indicators associated with a plurality of different synchronization signal blocks (SSBs). The processor is further configured to select a transmission time of a random access retransmission, by the second node, using a preamble associated with one of the plurality of different SSBs based on a backoff indicator of the plurality of different backoff indicators that is associated with the one of the plurality of different SSBs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
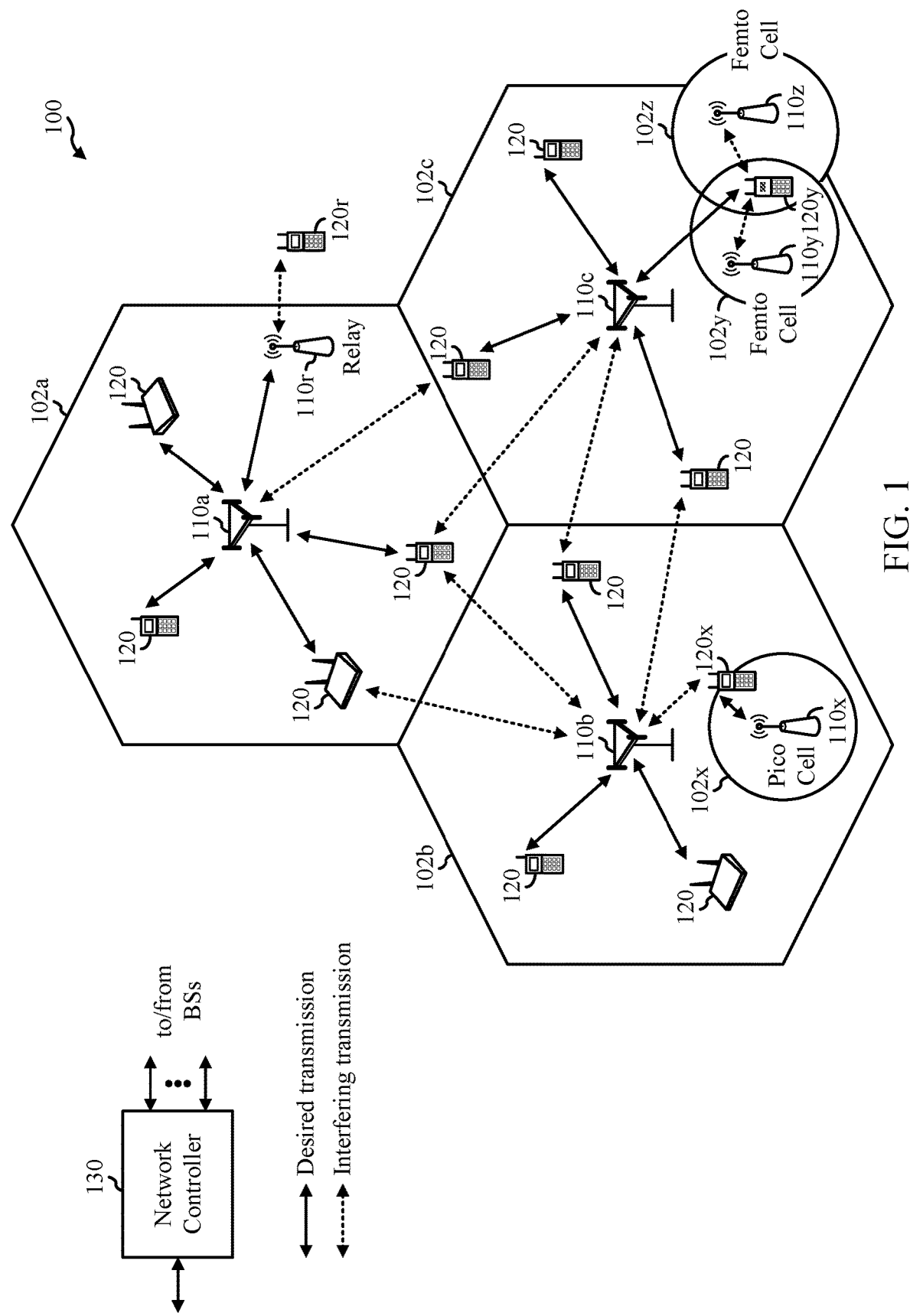
FIG. 1 is a block diagram conceptually illustrating an example telecommunications system, in accordance with certain aspects of the present disclosure.

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe. In LTE, the basic transmission time interval (TTI) or packet duration is 1 subframe. In NR, a subframe may still be 1 ms, but the basic TTI may be referred to as a slot. A subframe may contain a variable number of slots (e.g., 1, 2, 4, 8, 16, . . . slots) depending on the tone-spacing (e.g., 15, 30, 60, 120, 240 . . . kHz).

Aspects of the present disclosure relate to providing different backoff indicators for performing random access for different spatial beams transmitted by a base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. The BS 110 may be configured to perform the operations 800 and methods described herein for providing different backoff indicators for performing random access for different spatial beams transmitted by the BS 110. The UE 120 may perform complementary operations to the operations 800 by the BS 110.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals (SS), but in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
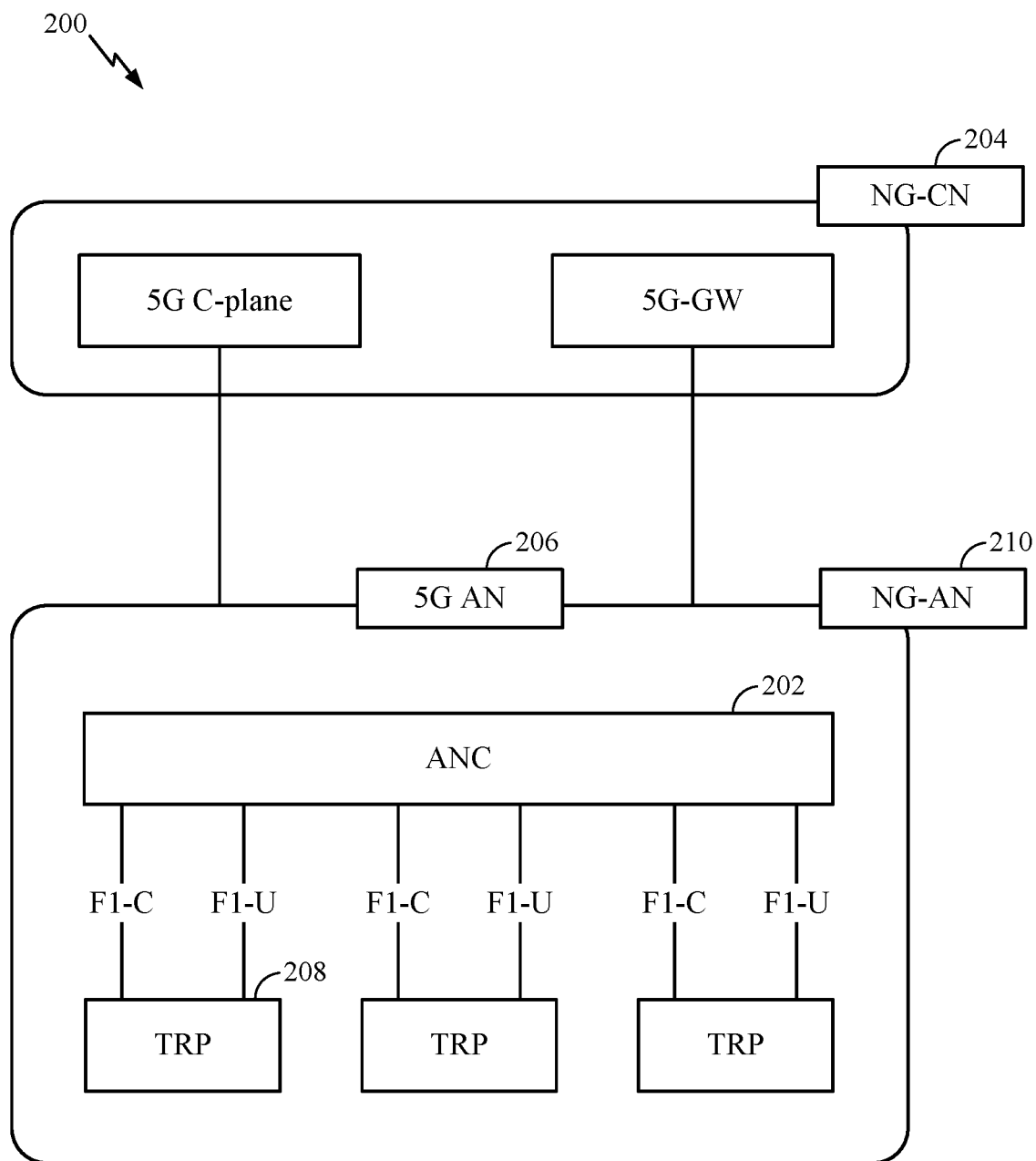
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
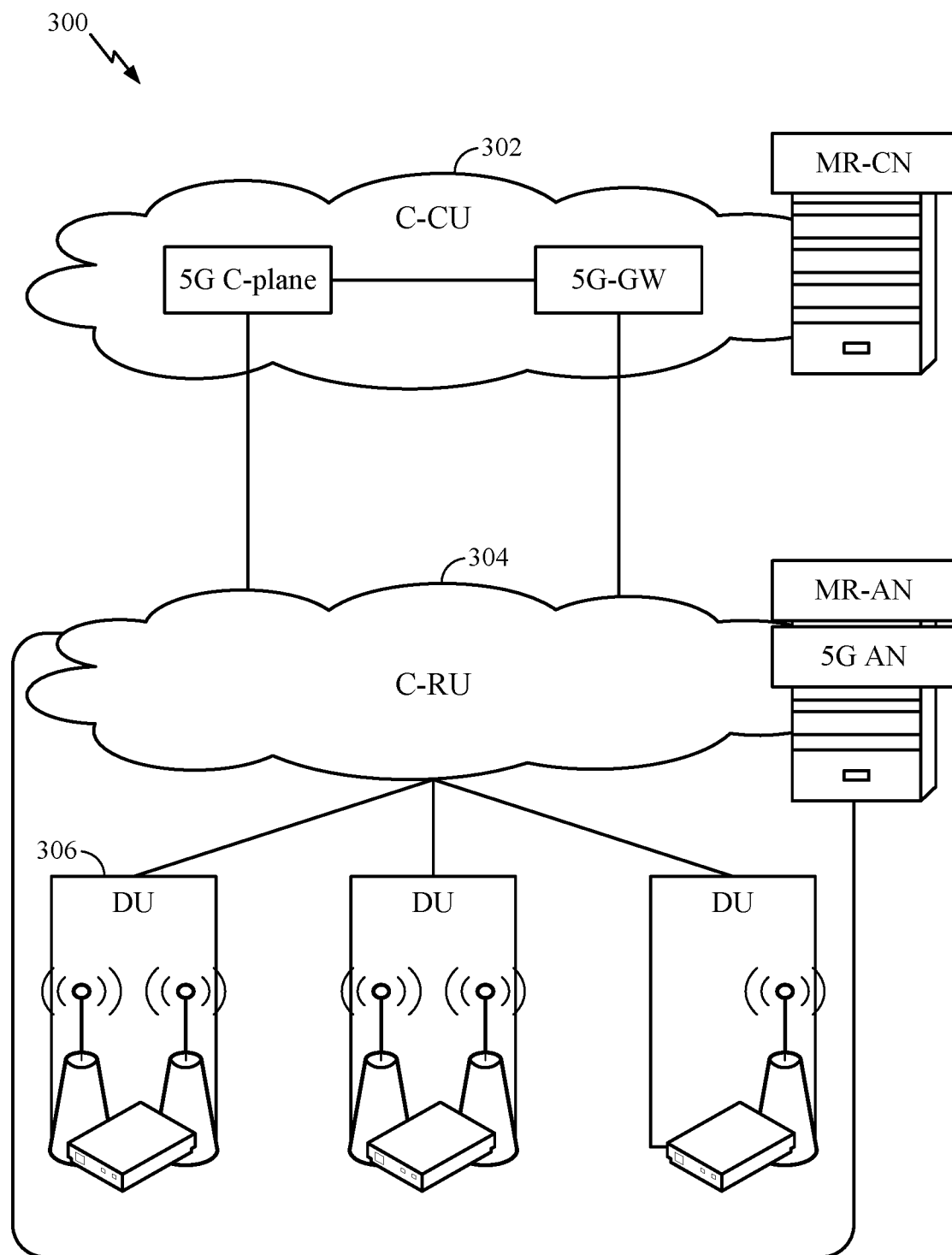
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
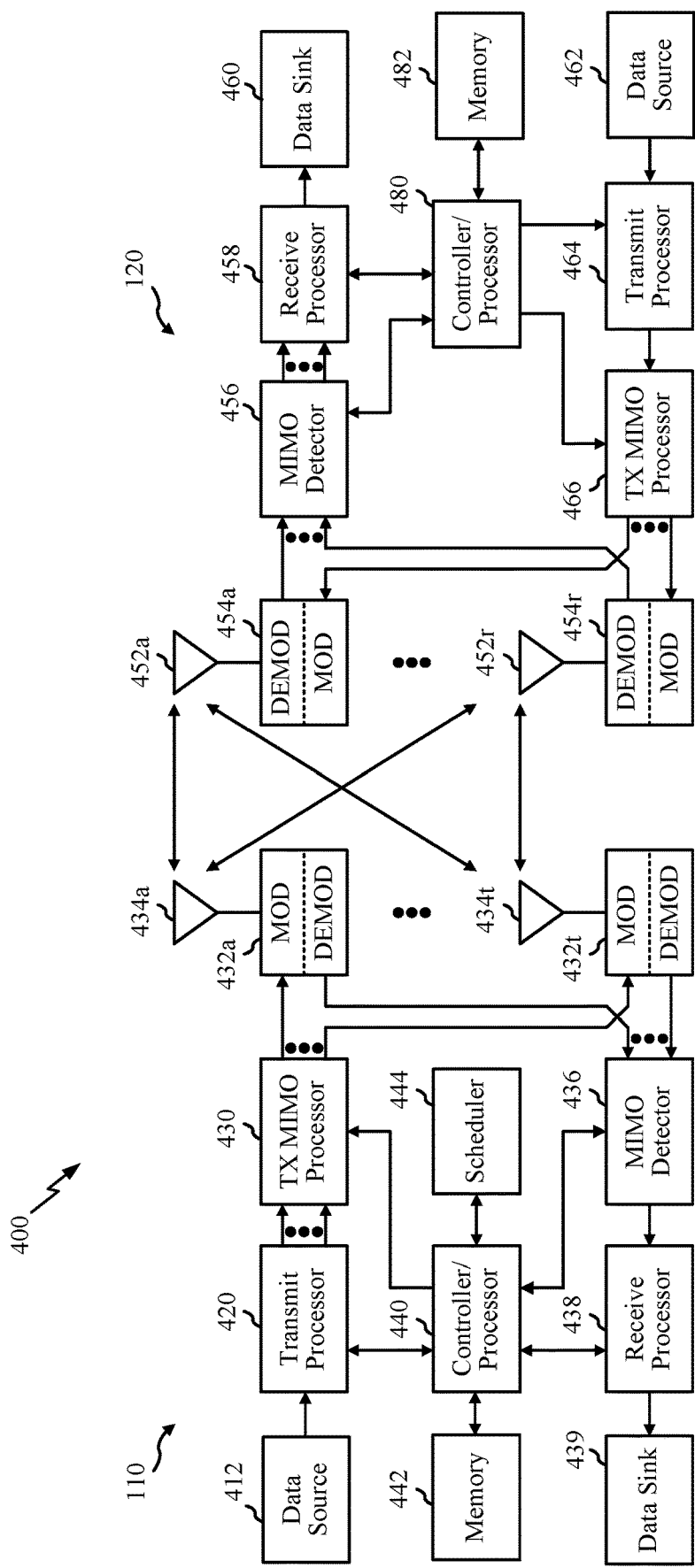
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations 1100 and/or 1200 described herein and illustrated with reference to FIGS. 11 and 12 and complementary operations.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of the functional blocks illustrated in FIGS. 11, 12, and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
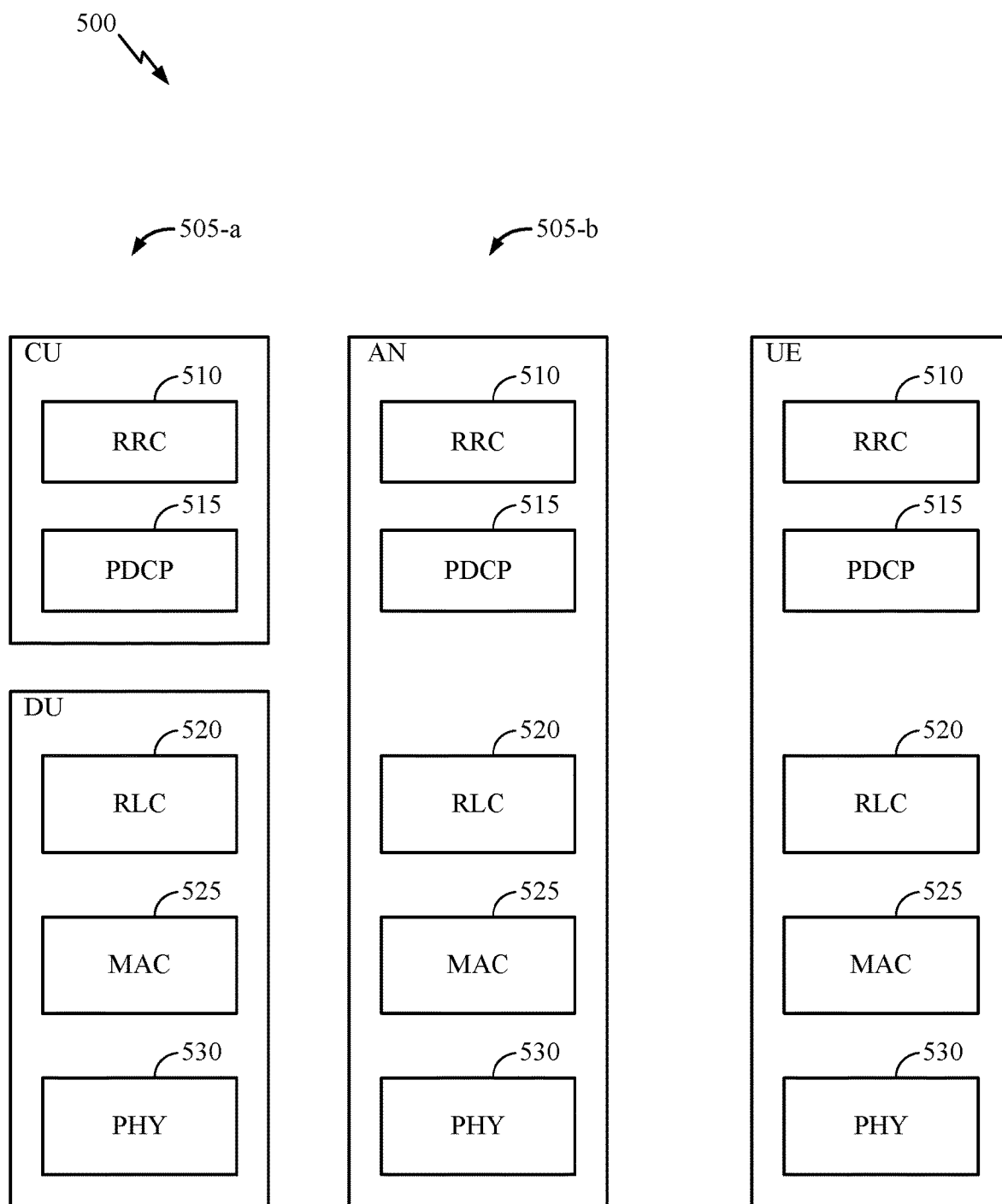
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
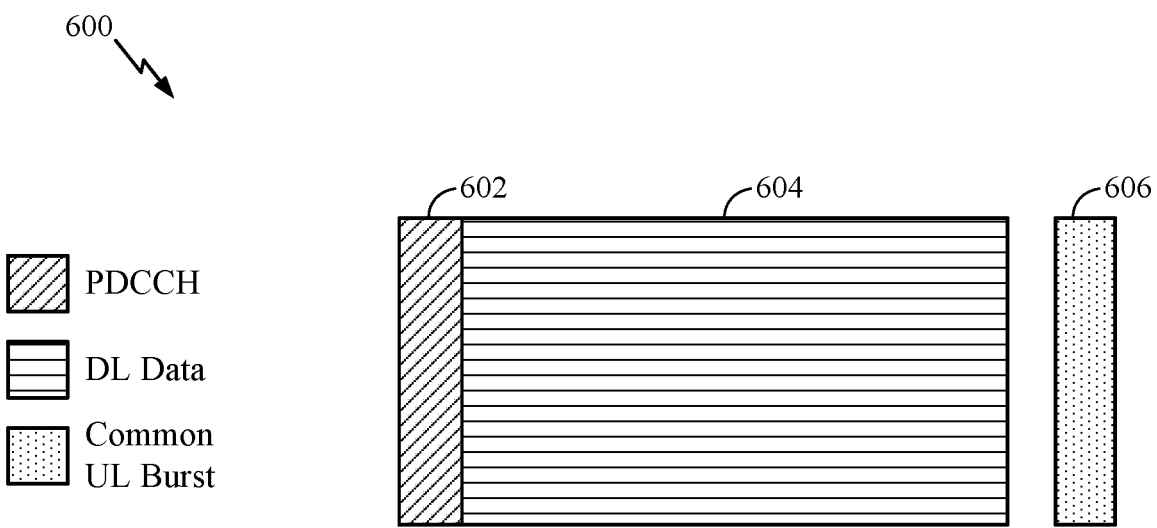
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
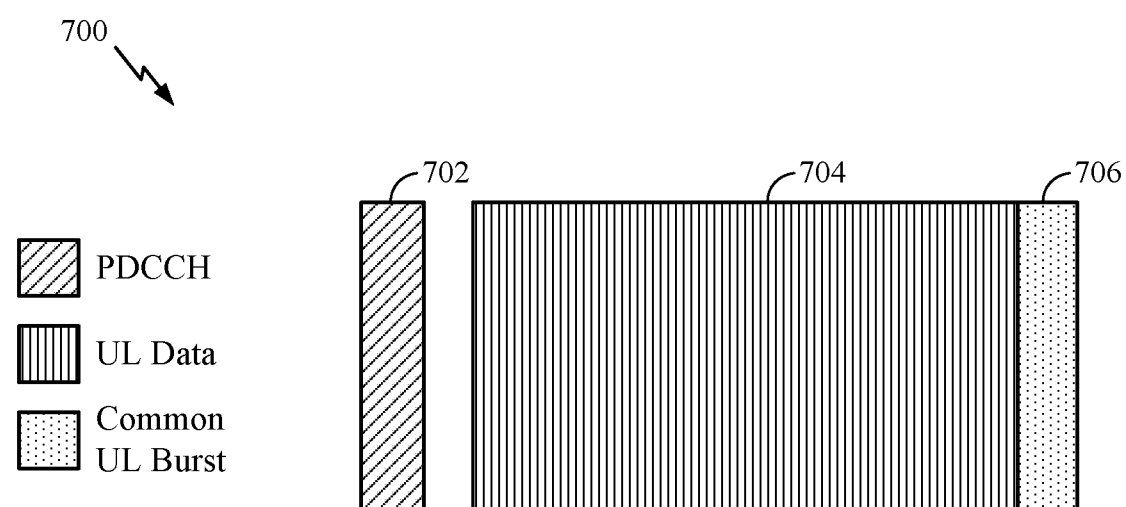
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Specific Backoff Indicator

In certain aspects, a UE 120 may try and communicate with a BS 110 utilizing a random access procedure (e.g., also referred to as a RACH procedure for communicating with the BS 110 on a RACH). For example, a UE 120 may not be synchronized with a BS 110, such as when the UE 120 is trying to handover to the BS 110 from another BS, or when the UE 120 is trying to initially access a network 100 via the BS 110. The UE 120 may be configured to make RACH attempts to achieve UL synchronization with the BS 110. RACH procedures may include contention-based RACH procedures and/or contention-free RACH procedures. It should be noted that certain aspects discussed herein may be applicable to one or both of contention-based RACH procedures and contention-free RACH procedures.

In certain aspects, as part of a RACH procedure, UE 120 may initially transmit to BS 110 a preamble. The UE 120 may select the preamble from a plurality of possible preambles reserved for RACH. The BS 110 may, in response, transmit a random access response (RAR) to the UE 120 (e.g., on PDSCH). The RAR may indicate the identity of the detected preamble, a timing alignment instruction to synchronize subsequent UL transmissions from the UE 120, an initial UL resource grant (e.g., resources granted to the UE 120 for UL transmission to the BS 110), etc. The UE 120 can then utilize the granted resources to communicate with the BS 110 on the UL.

In certain cases, the RAR may include a backoff indicator (BI) that instructs UE 120 to backoff for a period of time before retrying a RACH procedure. For example, the network may be congested and many UEs 120 may be communicating with the BS 110 on the UL. Accordingly, the BS 110 may be unable to grant UL resources to the UE 120 for the UE 120 to communicate with the BS 110 on the UL. To prevent the UE 120 from immediately again trying to perform a RACH and wasting network resources, the BS 110 may send a BI to the UE 120 so that it does not retry the RACH procedure immediately. The BI informs the UE 120 to wait a duration before trying the RACH procedure again.

In certain aspects, the BI is included in a special media access control (MAC) subheader of the RAR that includes a BI field that carries the BI parameter. The MAC header for RAR may be a variable size header that includes an extension (E) field, type (T) field, one or more reserved bits (R), random access preamble identifier (RAPID), and/or the BI field. The E field may be a flag that indicates if more fields are present in the MAC header or not. If the E field is set to "1", it may indicate that at least another set of E, T, and RAPID fields follow the E field. If the E field is set to "0", it may indicate that a MAC RAR or padding starts at the next byte. The T field may be a flag indicating whether the MAC subheader includes a RAPID or a BI. If the T field is set to "0", the MAC subheader includes a BI. If the T field is set to "1", the MAC subheader includes a RAPID.

In certain aspects, the BI field may be 4 bits that indicate an index value selected from 0-15. The different index values may map to different backoff parameter values (e.g., in ms). The actual time that a UE 120 performs backoff may be chosen by the UE in the interval of 0 to the backoff parameter value, meaning the time period the UE 120 backs off may be based on the BI, but not deterministic for a given BI value. For example, in certain aspects, the UE 120 selects the transmission time of a random access retransmission to perform the RACH procedure based on the BI. In certain aspects, the UE 120 selects a waiting time uniformly distributed from a time reference zero to a time specified by the BI for waiting before the transmission time. In other words, in certain aspects, the transmission time is selected as a time between the time reference zero and the time specified by the BI. In certain aspects, the time reference zero indicates or corresponds to an end of a random access response window defined for the UE 120. In certain aspects, the time reference zero indicates or corresponds to a reception timing of a random access channel message (RACH Msg2), such as from the BS 110.

In certain aspects, for UE 120 to connect to a BS 110, it may need to perform a cell search for BSs near UE 120. For this purpose, BS 110 may transmit synchronization signal blocks (SSBs) (e.g., including one or more synchronization signals such as a primary synchronization signal (PSS) and secondary synchronization signal (SSS) along with PBCH). In certain aspects, the BS 110 may support beamforming to spatially beamform and transmit signals as beams in different spatial directions. Accordingly, the BS 110 may need to perform beam sweeping and transmit SSBs over each of the beams in order to cover the cell of the BS 110.

Figure 8:
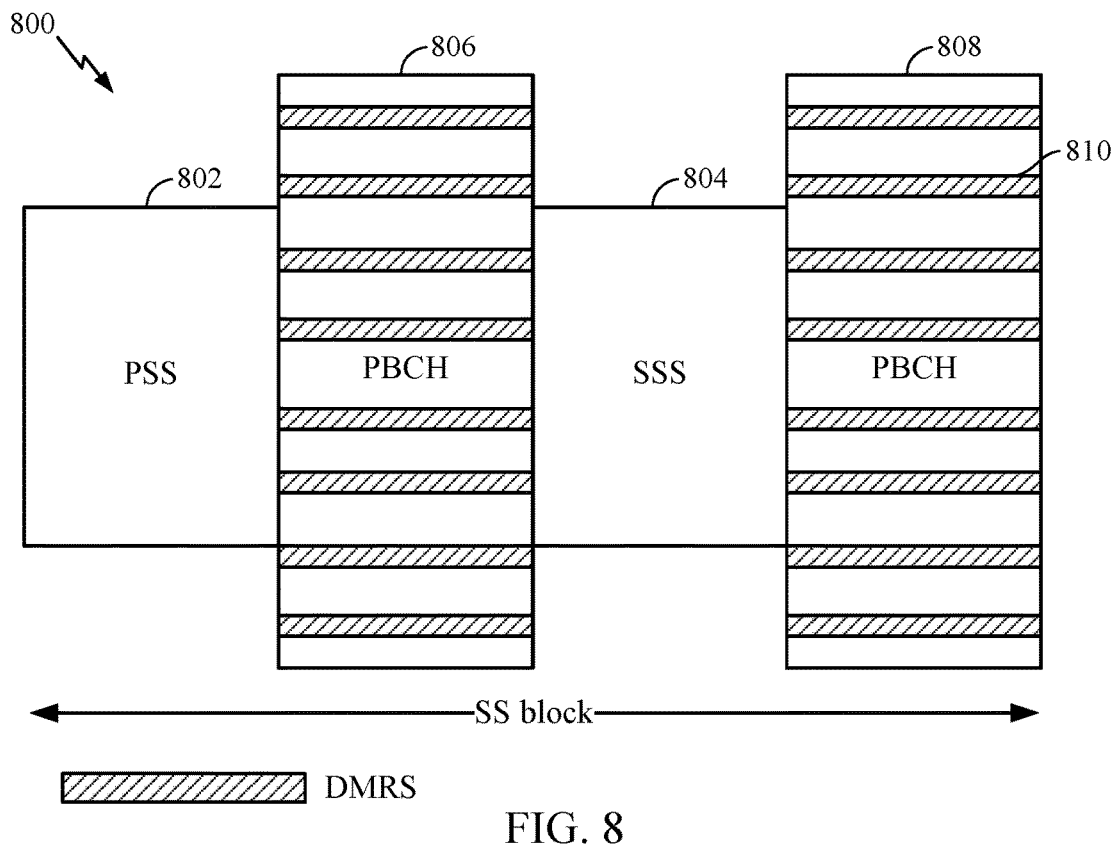
FIG. 8 illustrates an example of a synchronization signal block (SSB), in accordance with certain aspects.

FIG. 8 illustrates an example of a SSB 800, in accordance with certain aspects. The X-axis in the illustration of FIG. 8 indicates time (e.g., symbols), and the Y-axis indicates frequency (e.g., tones). As shown, SSB 800 includes a PSS 802, a SSS 804, a PBCH 806, and a PBCH 808 multiplexed in the time domain and allocated to certain frequency ranges. In certain aspects, the PSS 802 and SSS 804 are allocated to the same frequency range. Further, in certain aspects, the PBCH 806 and PBCH 808 are allocated to the same frequency range. In certain aspects, the PSS 802 and SSS 804 are allocated to a portion (e.g., half) of the frequency range of the PBCH 806 and PBCH 808. Though shown in a particular order in SSB 800 and of particular durations and frequency allocations, it should be noted that the order, durations, and frequency allocations of the PSS 802, SSS 804, PBCH 806, and PBCH 808 may be different. Further, the SSB 800 may include additional or fewer reference signals or additional or fewer PBCH. Further, in certain aspects, for each of PBCH 806 and PBCH 808, certain portions (e.g., frequency ranges, tones, resource elements (REs)) are allocated to transmission of reference sequences, such as in demodulation reference signal (DMRS) 810. It should be noted that though certain aspects are described herein with respect to a DMRS in a SSB, other types of reference sequences may similarly be selected and included in the SSB instead. In certain aspects, the allocation may be different than shown in FIG. 8.

In certain aspects, multiple SSBs may be assigned to a set of resources to transmit the multiple SSBs (such a set of resources for transmitting multiple SSBs may be referred to herein as a SS burst set). The multiple SSBs may be assigned to periodic resources (e.g., every 20 ms) and transmitted periodically by a BS (e.g., BS 110) in a cell. For example, a SS burst set may include a number L of SSBs (e.g., 4, 8, or 64). In certain aspects the number L of SSBs included in a SS burst set is based on the frequency band used for transmission. For example, for sub 6 GHz frequency transmissions, L may equal 4 or 8 (e.g., 0-3 GHz L=4, 3-6 GHz L=8). In another example, for transmission above 6 GHz, L may equal 64. For example, transmission by the BS 110 in a cell may be beamformed, so that each transmission only covers a portion of the cell. Therefore, different SSBs in a SS burst set may be transmitted in different directions so as to cover the cell. The number L of SSBs in a SS burst set may represent a maximum allowed number of SSBs that can be transmitted within the SS burst set. In other words, the BS 110 may have flexibility in terms of which SSBs are actually transmitted. For example, a BS 110 operating in a frequency band above 6 GHz may have opportunity to transmit up to 64 SSBs within the SS burst set, but the BS 110 may transmit fewer than the allocated possible 64 SSBs.

Figure 9:
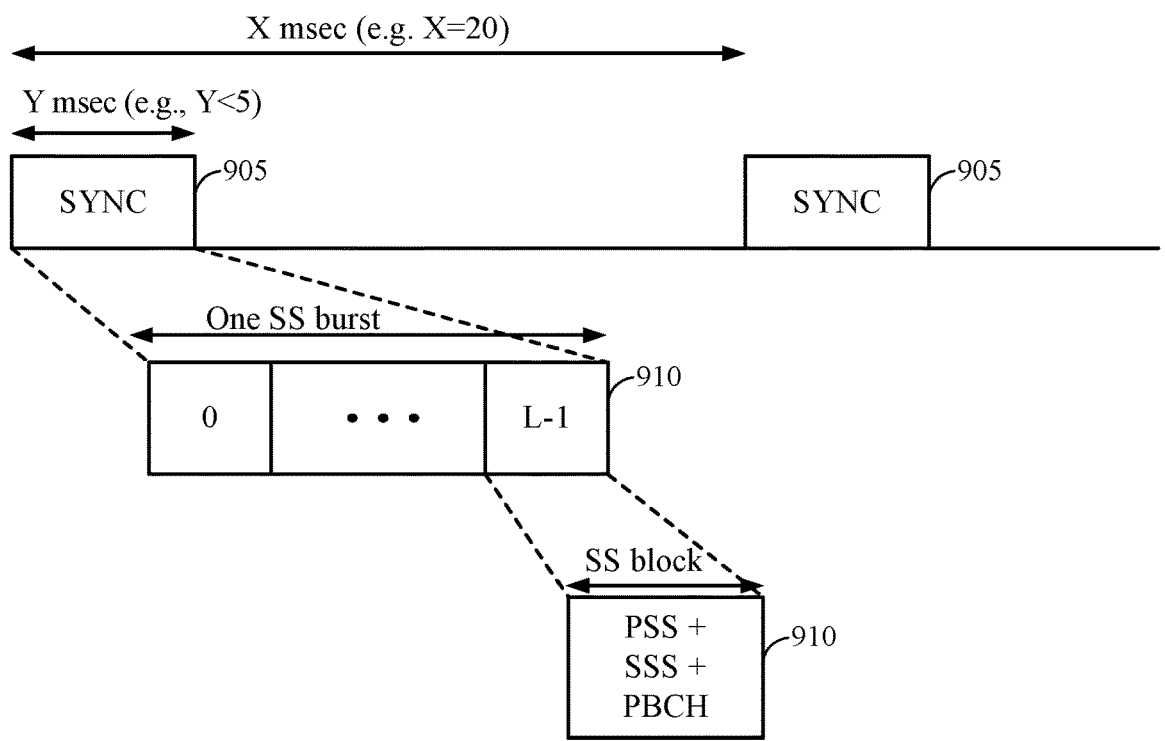
FIG. 9 illustrates an example of the timing of transmission of SSBs, in accordance with certain aspects.

FIG. 9 illustrates an example of the timing of transmission of SSBs, in accordance with certain aspects. As shown, a SS burst set 905 may be transmitted periodically every X msec (e.g., X=20). Further, the SS burst set 905 may have a duration of Y msec (e.g., Y<5), wherein all of the SSBs 910 in the SS burst set 905 are transmitted within the duration Y. As shown in FIG. 9, each SSB 910 includes a PSS, SSS, and PBCH. SSB 910 may for example, correspond to a SSB 800. SS burst set 905 includes a maximum of L SSBs 910 each having a corresponding SSB index (e.g., 0 through L−1) indicating its location within the SS burst set, e.g. indicating the physical transmission ordering in time of the SSBs 910. Though the SSBs 910 are shown allocated in time consecutively in SS burst set 905, it should be noted that the SSBs 910 may not be allocated consecutively. For example, there may be separation in time (e.g., of the same or different durations) between the SSBs 910 in the SS burst set 905. The allocation of time of the SSBs 910 may correspond to a particular pattern, which may be known to the BS 110 and UE 120.

Figure 10A:
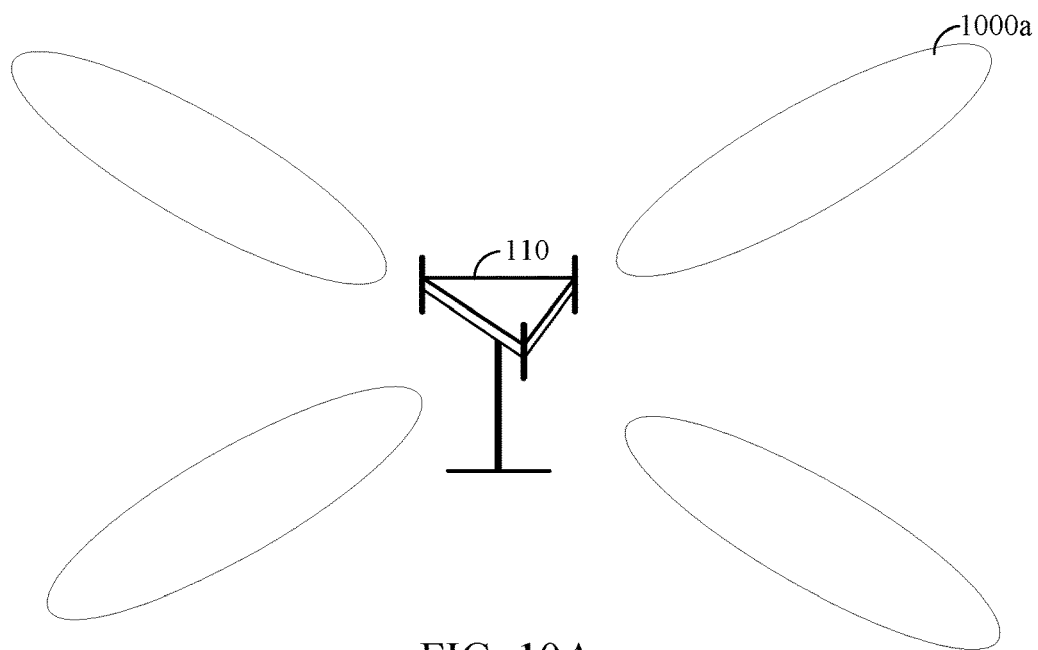
FIGS. 10A-10B illustrates example beamformed transmissions by a BS carrying SSBs in different directions to cover a cell, in accordance with certain aspects.
Figure 10B:
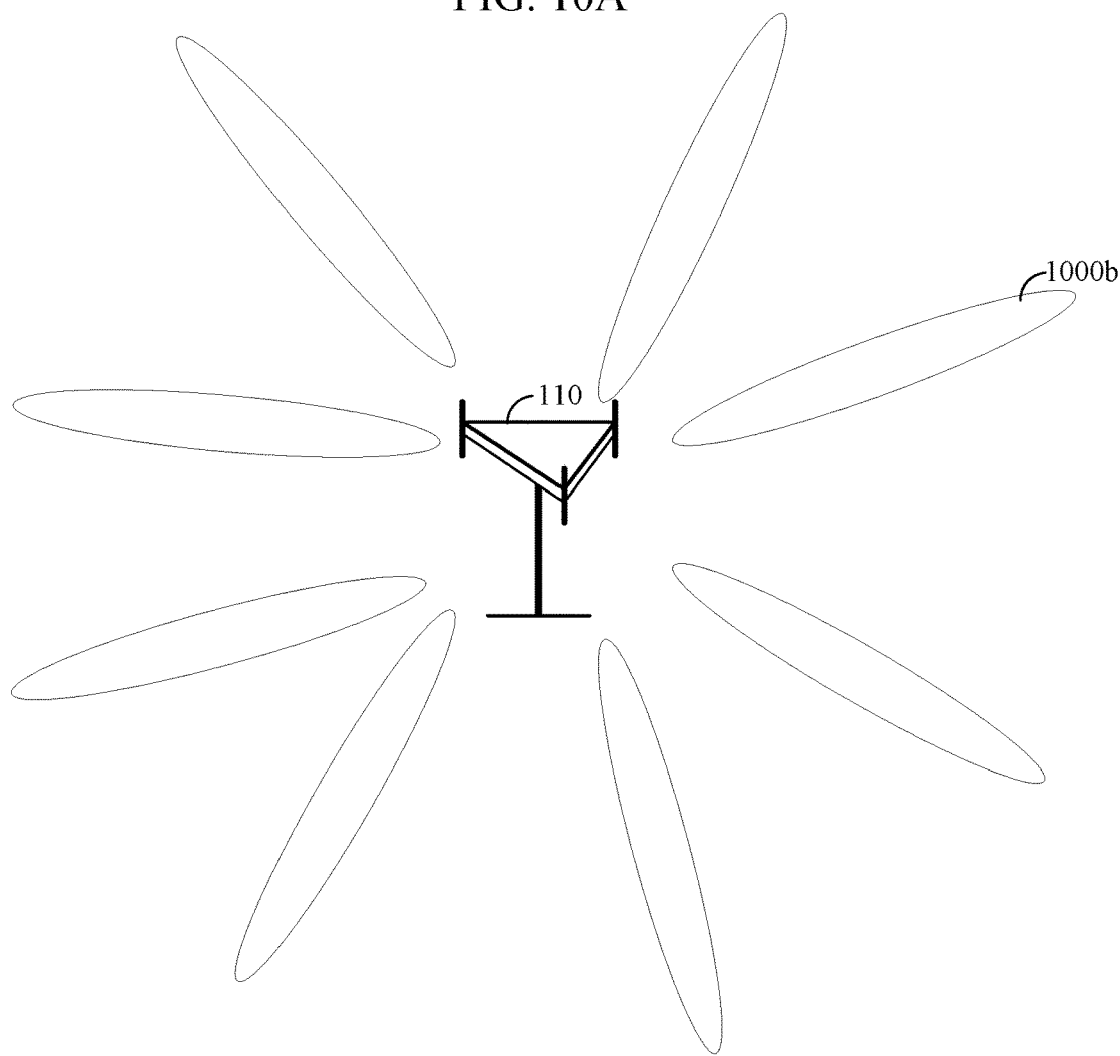

FIGS. 10A-10B illustrates example beamformed transmissions by a BS 110 carrying SSBs in different directions to cover a cell. For example, FIG. 10A illustrates four beamformed transmissions 1000a in different directions for transmitting four SSBs of a SS burst set including four SSBs. In another example, FIG. 10B illustrates eight beamformed transmissions 1000b for transmitting eight SSBs of a SS burst set including eight SSBs.

In certain aspects, there is a defined mapping of each SSB to a set of RACH resources (e.g., for each SSB there is a particular RACH resource/preamble). For example, a UE 120 may determine the RACH resource to use based on which SSB out of the possible SSBs in the SS burst set is received by the UE 120 (e.g., a SSB beamformed to a particular sector in which the UE 120 is located). In certain aspects, the UE has the flexibility to use different SSBs for determining RACH retransmission resources. For example, the UE can select a SSB and then utilize the associated preamble of the SSB for RACH retransmission (e.g., performing a RACH procedure after a backoff interval). The UE may select a SSB transmitted in the direction of the UE and received by the UE in that direction.

In certain aspects, the congestion level in the network for different SSBs may be different due to interference. For example, certain SSBs may be transmitted in a direction where there are a large number of UEs 120 trying to access BS 110 and there may be more congestion, while certain SSBs may be transmitted in a direction where there are a fewer number of UEs 120 trying to access BS 110 and there may be less congestion. Due to the difference in congestion for the different SSBs/beams/directions from BS 110, certain aspects herein relate to providing different BI for UEs 120 to use for RACH procedures based on the SSB used by the UE 120 to perform RACH (which may be based on the location of UE 120/direction of UE 120 with respect to BS 110). By providing different BIs for different SSBs, an appropriate BI can be indicated based on the congestion level for a particular direction, instead of one BI being used for different directions with different congestion levels. Accordingly, a UE may not receive a BI that indicates more congestion than the actual congestion in a given direction, which reduces the latency for the UE to perform RACH. Further, a UE may not receive a BI that indicates less congestion than the actual congestion in a given direction, which reduces the UE performing RACH too often when there is congestion, thereby reducing waste of communication resources in the network and processing resources of the UE.

In certain aspects, BS 110 may indicate a mapping of SSBs to BIs for all SSBs in the RAR. The UE 120 may then know all the mappings of SSBs to BIs and can select a SSB/preamble to use for RACH accordingly. However, this may add significant overhead (e.g., 256 bits) in the RAR to transmit all the information.

In certain aspects, BS 110 may indicate a mapping of SSBs to BIs for all SSBs actually transmitted by BS 110 in the RAR. In certain aspects, the BS 110 may be configured to broadcast on the DL (e.g., in a remaining minimum system information (RMSI)) information indicating the actually transmitted SSBs.

In certain aspects, a set of SSBs (e.g., all SSBs, all actually transmitted SSBs, etc.) may be divided into sub-sets of one or more SSBs and the BS 110 may indicate a mapping of BIs to sub-sets in the RAR, such that each SSB in a sub-set has the same BI associated.

In certain aspects, BS 110 may indicate a single BI applicable to the current SSB being transmitted in the RAR. The UE 120 may then be configured to determine the BI values for other SSBs based on the BI value for the current SSB (e.g., based on an algorithm or equation). One example equation could be BInew=BIold−delta, where BIold is the BI of the previous SSB, BInew is the BI of the next SSB, and delta may be preset or configured (e.g., in RMSI).

In certain aspects, BS 110 may indicate two BIs in the RAR. One BI may be for the current SSB, and the other for all remaining SSBs. For example, this may be useful if the current SSB is very congested and the BS 110 wants UE 120 to use any other SSB for RACH. Accordingly, the BI for the current SSB could be set very high for a large backoff interval, and the other BI for the remaining SSBs could be set low.

In certain aspects, BS 110 may indicate a single BI in RAR and the UE 120 may assume that the BI is valid for all SSBs. In particular, since RAR corresponds to one RACH message (e.g., Msg1), which itself corresponds to one SSB, the BI will correspond to the one SSB.

In certain aspects, BS 110 does not configure any BI value in RAR and the UE 120 assumes it to be 0 for all SSBs.

In certain aspects, when BS 110 conveys BI in RAR, there may be a bit in the MAC header of the RAR that indicates whether a BI field is present or not in the RAR. Further, there may be another bit in the MAC header of the RAR that indicates whether additional BI fields (e.g., for other SSBs) are present or not in the RAR.

In addition to or alternative to communicating BI in RAR, in certain aspects, BS 110 may transmit one or more BIs (e.g., as discussed and interpreted according to different aspects described herein) to UE 120 in one or more of RMSI, PSS, SSS, PBCH, a demodulation reference signal (DMRS) of PBCH, PDCCH, a handover message, RRC signaling, etc. In certain aspects, there may be different RMSI for different SSBs where the RMSI corresponding to each SSB includes the BI only for the SSB.

In certain aspects, the described techniques may not only be applicable to UE 120 performing RACH procedures for accessing a BS 110 on a UL, but may also be used for BS to BS links and UE to UE links. For example, BSs 110 may be configured to communicate on a backhaul and utilize RACH procedures for wireless communication on the backhaul (e.g., for a new BS 110 to join network 100). Further, in certain aspects, a UE 120 may act as a BS 110 and provide access to network 100 to another UE 120. In certain aspects, there may be different BI tables (e.g., BI values mapped to backoff parameter values) for different classes of UE categories and links (e.g., BS-UE links, BS-BS links, UE-UE links).

Figure 11:
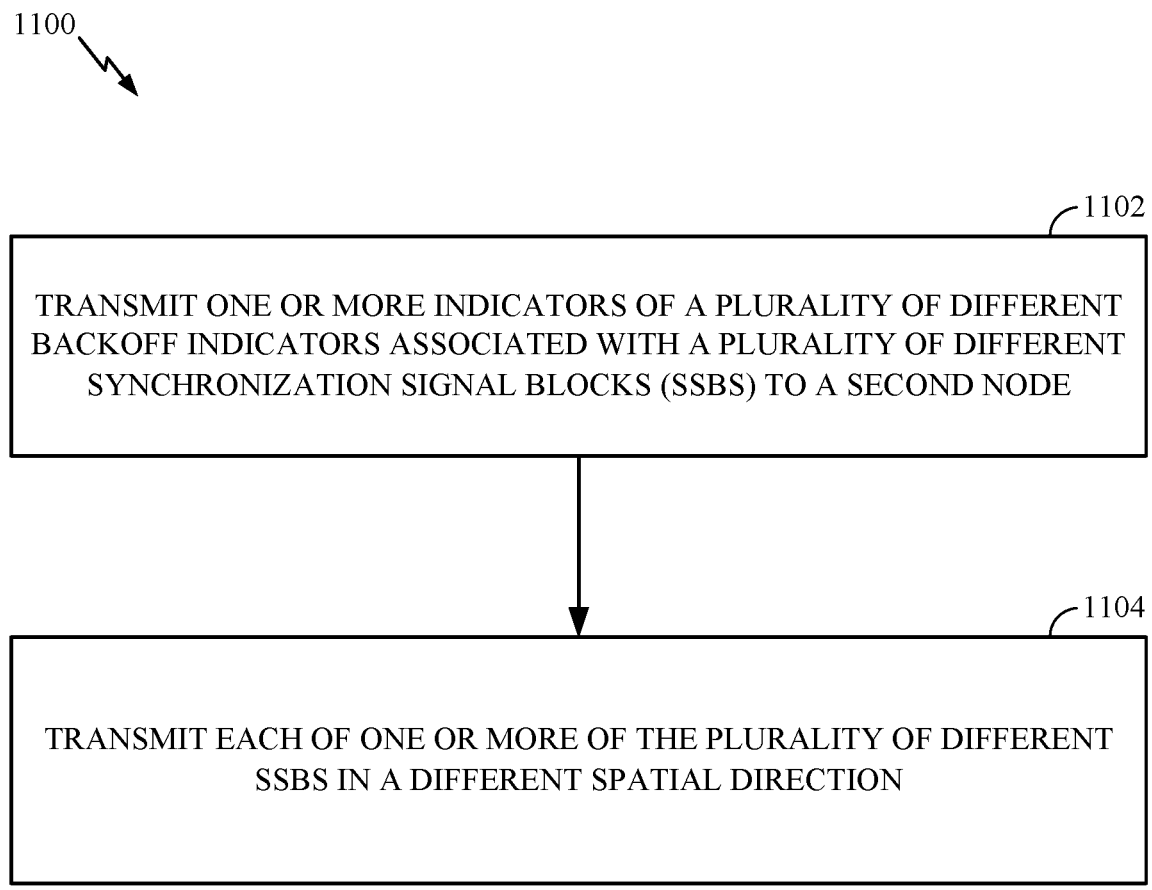
FIG. 11 illustrates example operations that may be performed by a wireless device such as a node for conveying backoff indicators for different beams in accordance with aspects of the present disclosure.

FIG. 11 illustrates example operations 1100 that may be performed by a node such as a base station (BS) (e.g., BS 110) or UE (e.g., UE 120) for conveying backoff indicators for different beams (e.g., to a BS or UE) in accordance with aspects of the present disclosure.

Operations 1100 begin, at 1102, by a first node transmitting one or more indicators of a plurality of different backoff indicators associated with a plurality of different synchronization signal blocks (SSBs) to a second node. At 1104, the first node transmits each of one or more of the plurality of different SSBs in a different spatial direction.

Figure 12:
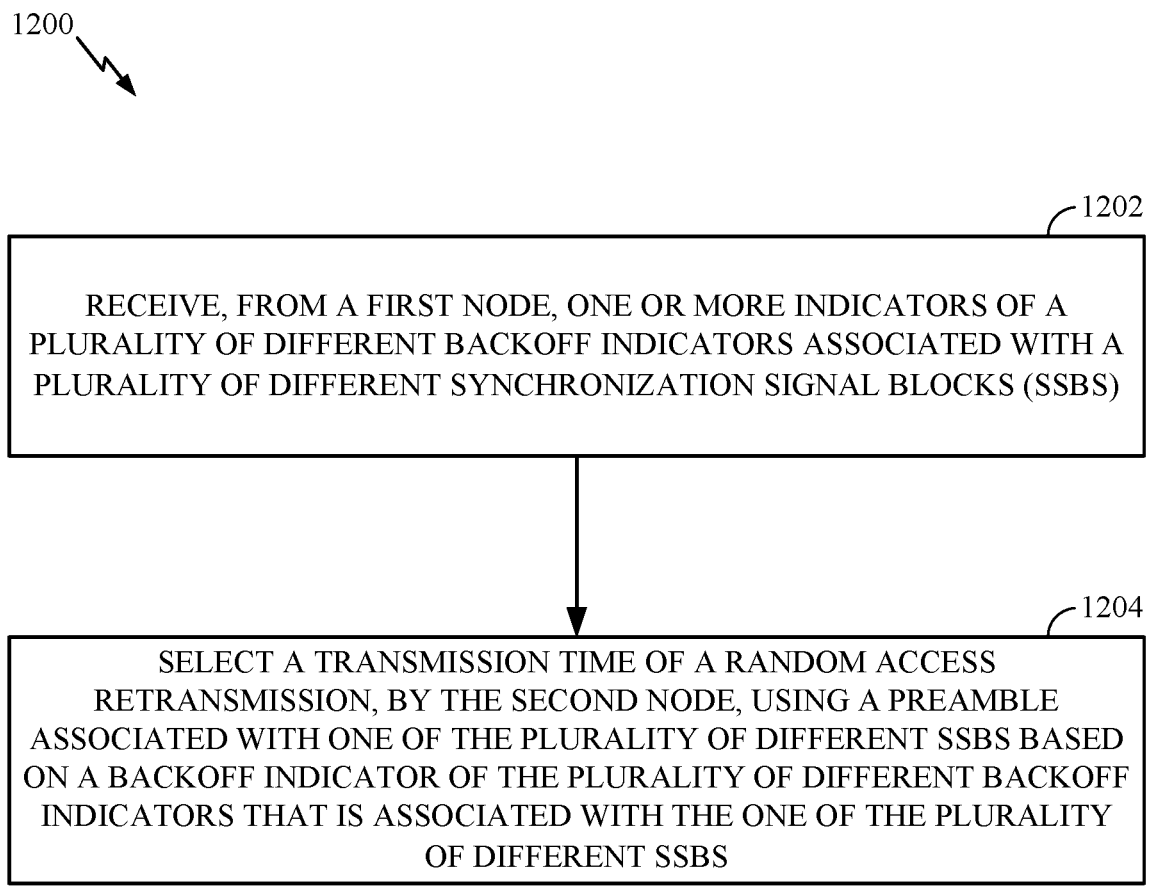
FIG. 12 illustrates example operations that may be performed by a wireless device such as a node for refraining from performing a random access procedure based on received backoff indicators for different beams in accordance with aspects of the present disclosure.

FIG. 12 illustrates example operations 1200 that may be performed by a node such as a base station (BS) (e.g., BS 110) or UE (e.g., UE 120) for refraining from performing a random access procedure based on received backoff indicators for different beams (e.g., to a BS or UE) in accordance with aspects of the present disclosure.

Operations 1200 begin, at 1202, by receiving, from a first node, by a second node, one or more indicators of a plurality of different backoff indicators associated with a plurality of different synchronization signal blocks (SSBs). At 1204, the second node selects a transmission time of a random access retransmission, by the second node, using a preamble associated with one of the plurality of different SSBs based on a backoff indicator of the plurality of different backoff indicators that is associated with the one of the plurality of different SSBs. In certain aspects, the second node transmits the random access retransmission at the transmission time.

Figure 13:
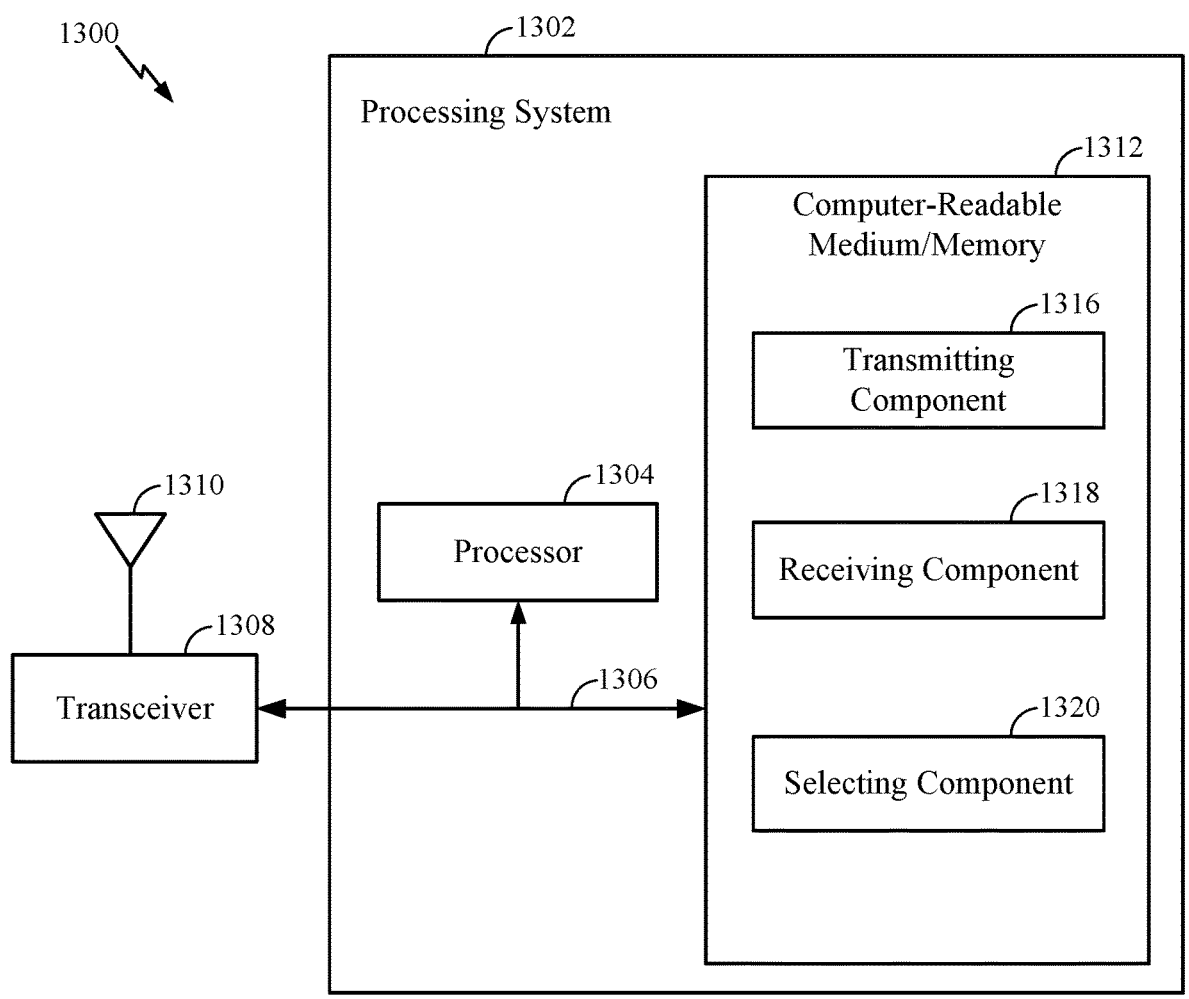
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 11 and/or 12. The communications device 1300 includes a processing system 1302 coupled to a transceiver 1308. The transceiver 1308 is configured to transmit and receive signals for the communications device 1300 via an antenna 1310, such as the various signal described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions that when executed by processor 1304, cause the processor 1304 to perform the operations illustrated in FIGS. 11 and/or 12, or other operations for performing the various techniques discussed herein.

In certain aspects, processing system 1302 includes a transmitting component 1316 for performing the operations illustrated FIG. 11. In certain aspects, processing system 1302 includes a receiving component 1318 for performing the operations 1202 illustrated FIG. 12. In certain aspects, processing system 1302 includes a selecting component 1320 for performing the operations 1204 illustrated FIG. 12. The transmitting component 1316, receiving component 1318, and/or selecting component 1320 may be coupled to the processor 1304 via bus 1306. In certain aspects, the transmitting component 1316, receiving component 1318, and/or selecting component 1320 may be hardware circuits. In certain aspects, transmitting component 1316, receiving component 1318, and/or selecting component 1320 may be software components that are executed and run on processor 1304.

In certain aspects, a random access-radio network temporary identifier (RA-RNTI) may be associated with a RAR. For example, in certain aspects, the BS 110 may be configured to scramble a downlink assignment transmitted on the downlink (e.g., scramble a cyclic redundancy check (CRC) of the downlink assignment transmitted on PDCCH), with a particular RA-RNTI. The downlink assignment may indicate a downlink assignment for transmission of the RAR by the BS 110 (e.g., on PDSCH), meaning it indicates the transmission of the RAR. In order for the UE 120 to be able to receive the RAR, the UE 120 may need the downlink assignment, and therefore be able to descramble the downlink assignment. For the UE 120 to be able to descramble the downlink assignment, therefore, it needs the correct RA-RNTI used to scramble the downlink assignment. If the UE 120 does not have the correct RA-RNTI, the UE 120 cannot descramble the downlink assignment and will not receive the RAR. However, if the UE 120 is able to descramble the downlink assignment, it has the RA-RNTI associated with the RAR. In certain aspects, the RAR itself may be scrambled with the RA-RNTI, or associated with RA-RNTI in another way (e.g., include RA-RNTI).

In certain aspects, the RA-RNTI may be calculated as a function of an SSB identifier (e.g., SSB index that identifies a particular SSB, such as transmitted in a certain beam/direction). In such aspects, the RAR associated with the RA-RNTI may be for the particular SSB identified by the SSB identifier only. In certain aspects, the RA-RNTI may not be calculated based on an SSB identifier. Accordingly, the RAR associated with the RA-RNTI may be for multiple SSBs for which the UE 120 selected to transmit a RACH message (e.g., Msg1).

In certain aspects, the RA-RNTI is calculated as a function of both an SSB identifier and a RACH transmission occasion (RO) index (e.g., that identifies a particular RACH transmission opportunity (e.g., in time) for the UE 120 to perform RACH), and the RAR associated with the RA-RNTI may correspond only to the one SSB identified by the SSB identifier. In certain aspects, the RA-RNTI is calculated as a function of a RO index but not an SSB identifier, and the RAR associated with the RA-RNTI may correspond to multiple SSBs that were mapped to the same RO.

As discussed, the congestion level corresponding to different SSBs during RACH message transmission (e.g., Mgs1 transmission) can be different due to different interference for the different SSBs. Accordingly, even if multiple SSBs are mapped to the same RO, the different SSBs may be mapped to different RACH preamble indices. For example, the different SSBs map to non-overlapping subsets of RACH preamble indices within one RO. Hence, these SSBs that occupy non-overlapping subsets of RACH preamble indices can experience different congestion levels.

Further, even if different SSBs are mapped to overlapping subsets of preamble indices, the congestion level can still be different for different SSBs. For example, if BS 110 transmits two SSBs to two different directions at two different times, while receiving PRACH, the BS 110 can receive simultaneously from two different directions (e.g., two UEs 120 transmitting RACH message). Accordingly, two SSBs are mapped to one PRACH resource. PRACH transmission of one UE which falls within the angular coverage of one direction does not interfere with that of another UE which falls within angular coverage of another direction even if both UEs select the same preamble index and resource for PRACH transmission. In this case, the congestion for each UE comes from the other UEs that fall within the angular coverage of their respective directions.

Accordingly, as discussed, the BS 110 may indicate BI values of, at least, the one or more SSBs that are associated with the corresponding RARs (i.e., RARs with the same RA-RNTI), such as according to the various aspects discussed herein.

A UE 120, as discussed, has the flexibility to select among different SSBs during RACH message (e.g., Msg1) retransmission. Further, as discussed, the BI for different SSBs can be different as well. For example, as discussed, if there is severe congestion in particular SSBs, the BS 110 may convey that information in the associated RAR.

In some aspects, the BS 110 can additionally indicate BIs and indices of a set of SSBs that are not associated with the corresponding RAR in the RAR, such as according to the various aspects discussed herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 11 and/or 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, the method comprising:
   transmitting, from a first node, in one random access response, a plurality of different backoff indicators associated with a plurality of different synchronization signal blocks (SSBs) to a second node; and
   transmitting, from the first node, one or more of the plurality of different SSBs, wherein the one or more of the plurality of different SSBs comprise multiple SSBs mapped to a same random access channel (RACH) occasion (RO), wherein the multiple SSBs are transmitted in different spatial directions, wherein different SSBs of the multiple SSBs are mapped to different RACH preamble indices.

2. The method of claim 1, wherein the first node is one of a base station or user equipment, and wherein the second node is one of a base station or user equipment.

3. The method of claim 1, further comprising:
   receiving, by the first node from the second node, a message including a preamble associated with one of the plurality of different SSBs for performing a random access procedure, wherein the first node transmits the random access response in response to the message.

4. The method of claim 3, wherein a bit is included in the random access response indicating the random access response includes the plurality of different backoff indicators instead of a single backoff indicator.

5. The method of claim 1, wherein the first node transmits at least one of the plurality of different backoff indicators in at least one of a remaining minimum system information (RMSI) or a handover message.

6. The method of claim 1, wherein the first node transmits at least one of the plurality of different backoff indicators in at least one of a primary synchronization signal, secondary synchronization signal, physical broadcast channel, demodulation reference signal of a physical broadcast channel, physical downlink control channel, or radio resource control signaling.

7. The method of claim 1, wherein the plurality of different backoff indicators comprise a different backoff indicator for each of the plurality of different SSBs.

8. The method of claim 1, wherein the plurality of different backoff indicators comprise a different backoff indicator for each of the one or more of the plurality of different SSBs.

9. The method of claim 1, wherein the one or more of the plurality of different SSBs are divided into a plurality of subsets, and wherein the plurality of different backoff indicators comprise a different backoff indicator for each subset of the plurality of subsets.

10. The method of claim 1, wherein the plurality of different backoff indicators comprise two backoff indicators, wherein one backoff indicator is for a single SSB, and one backoff indicator is for a plurality of other SSBs than the single SSB.

11. The method of claim 1, wherein the plurality of different backoff indicators are determined based on different congestion levels corresponding to the plurality of different SSBs.

12. A first node comprising:
a memory; and
a processor coupled to the memory, the processor being configured to:
transmit, in one random access response, a plurality of different backoff indicators associated with a plurality of different synchronization signal blocks (SSBs) to a second node; and
transmit one or more of the plurality of different SSBs, wherein the one or more of the plurality of different SSBs comprise multiple SSBs mapped to a same random access channel (RACH) occasion (RO), wherein the multiple SSBs are transmitted in different spatial directions, wherein different SSBs of the multiple SSBs are mapped to different RACH preamble indices.

13. The first node of claim 12, wherein the first node is one of a base station or user equipment, and wherein the second node is one of a base station or user equipment.

14. The first node of claim 12, wherein the processor is further configured to:
receive, from the second node, a message including a preamble associated with one of the plurality of different SSBs for performing a random access procedure, wherein the first node transmits the random access response in response to the message.

15. The first node of claim 14, wherein a bit is included in the random access response indicating the random access response includes the plurality of different backoff indicators instead of a single backoff indicator.

16. The first node of claim 12, wherein the first node transmits at least one of the plurality of different backoff indicators in at least one of a remaining minimum system information (RMSI) or a handover message.

17. The first node of claim 12, wherein first node transmits at least one of the plurality of different backoff indicators in at least one of a primary synchronization signal, secondary synchronization signal, physical broadcast channel, demodulation reference signal of a physical broadcast channel, physical downlink control channel, or radio resource control signaling.

18. The first node of claim 12, wherein the plurality of different backoff indicators comprise a different backoff indicator for each of the plurality of different SSBs.

19. The first node of claim 12, wherein the plurality of different backoff indicators comprise a different backoff indicator for each of the one or more of the plurality of different SSBs.

20. A method for wireless communication, the method comprising:
receiving, from a first node, by a second node, in one random access response, a plurality of different backoff indicators associated with a plurality of different synchronization signal blocks (SSBs), wherein multiple SSBs of the plurality of different SSBs are mapped to a same random access channel (RACH) occasion (RO), wherein the multiple SSBs are transmitted in different spatial directions, wherein different SSBs of the multiple SSBs are mapped to different RACH preamble indices; and
selecting a transmission time of a random access retransmission, by the second node, using a preamble associated with one of the plurality of different SSBs based on a backoff indicator of the plurality of different backoff indicators that is associated with the one of the plurality of different SSBs.

21. The method of claim 20, where selecting the transmission time of the random access retransmission comprises selecting a waiting time uniformly distributed from a time reference zero to a time specified by the backoff indicator for waiting before the transmission time.

22. The method of claim 21, where the time reference zero indicates an end of a random access response window or a reception timing of a random access channel message.

23. The method of claim 20, further comprising selecting, by the second node, the one of the plurality of different SSBs for performing the random access procedure based on the plurality of different backoff indicators.

24. A first node comprising:
a memory; and
a processor coupled to the memory, the processor being configured to:
receive, from a second node, in one random access response, a plurality of different backoff indicators associated with a plurality of different synchronization signal blocks (SSBs), wherein multiple SSBs of the plurality of different SSBs are mapped to a same random access channel (RACH) occasion (RO), wherein the multiple SSBs are transmitted in different spatial directions, wherein different SSBs of the multiple SSBs are mapped to different RACH preamble indices; and
select a transmission time of a random access retransmission, by the second node, using a preamble associated with one of the plurality of different SSBs based on a backoff indicator of the plurality of different backoff indicators that is associated with the one of the plurality of different SSBs.

25. The first node of claim 24, wherein the processor is further configured to select the one of the plurality of different SSBs for performing the random access procedure based on the plurality of different backoff indicators.

* * * * *